United States Patent [19]

Hikichi et al.

[11] Patent Number: 5,012,370
[45] Date of Patent: Apr. 30, 1991

[54] HEAD LIFTING AND DAMPER MECHANISM FOR DISC DRIVE UNIT

[75] Inventors: Tooru Hikichi, Miyagi; Junichi Ogasawara, Chiba, both of Japan

[73] Assignee: Sony Corporation, Tokyo, Japan

[21] Appl. No.: 442,772

[22] Filed: Nov. 28, 1989

[30] Foreign Application Priority Data

Dec. 3, 1988 [JP] Japan .................. 63-306260

[51] Int. Cl.$^5$ .............................................. G11B 5/54
[52] U.S. Cl. ................................................ 360/105
[58] Field of Search ............................. 360/104–106

[56] References Cited

U.S. PATENT DOCUMENTS

| | | | |
|---|---|---|---|
| 4,208,684 | 6/1980 | Janssen | 360/104 |
| 4,218,714 | 8/1980 | Isozaki | 360/105 |
| 4,308,564 | 12/1981 | Thompson | 360/105 X |
| 4,347,535 | 8/1982 | Dalziel | 360/105 X |
| 4,672,490 | 6/1987 | Shigenai | 360/105 |

Primary Examiner—A. J. Heinz
Attorney, Agent, or Firm—Lewis H. Eslinger

[57] ABSTRACT

A head lifting mechanism for disc drive units includes a head carriage on which a lower head is mounted, and a head arm which is pivotably supported on the head carriage and on which an upper head is mounted. For the purposes of preventing the upper head from abruptly coming into contact with the disc-shaped recording medium, the head lifting mechanism also includes a damper mechanism. The damper mechanism comprises a slide chamber which is formed in the upper surface of the head arm, a sliding member which is slidable within the slide chamber in a direction perpendicular to the rotation axis of the head arm depending upon movement of the head arm, and a biasing member which biases the head arm downwards. The biasing member is cooperable with the sliding member for allowing the upper head arm to move gently downwards.

15 Claims, 4 Drawing Sheets

HEAD LIFTING AND DAMPER MECHANISM FOR DISC DRIVE UNIT

BACKGROUND OF THE INVENTION

1. Field of the Invention

The present invention relates generally to a head lifting mechanism for disc drive units. More particularly, the invention relates to a head lifting mechanism with a damper mechanism which causes the upper head to move downwards gently to come into contact with a disc loaded on the drive unit.

2. Description of the Prior Art

Some head lifting mechanisms for disc drive units have a damper mechanism by which the upper head of the drive unit moves downwards gently for the purpose of coming into contact with a disc loaded on the drive unit.

One such head lifting mechanism is disclosed in Japanese Utility Model First (unexamined) Publication (Jikkai Sho.) No. 60-51672. This head lifting mechanism is provided with a damper assembly. The damper assembly comprises a damper body, a shaft which is inserted into an opening formed in the damper body in order to pivotably support the damper body, a pair of engaging members which project from the damper body in a direction perpendicular to the shaft, a torsion spring which serves to bias the engaging members downwards, and silicone grease which fills a space defined by the opening of the damper body and the shaft. Such a damper assembly is relatively large, so a relatively large amount of space is required in order to arrange the damper assembly in the head lifting mechanism, thereby the disc drive unit becomes quite large. In addition, since the number of parts for a damper assembly is large and the construction thereof is complicated, high manufacturing cost as well as complicated assembling are required if such a damper assembly is used in a head lifting mechanism.

SUMMARY OF THE INVENTION

It is therefore a principal object of the present invention to eliminate the aforementioned disadvantage and to provide a head lifting mechanism for disc drive units, which has a compact, inexpensive damper mechanism.

It is another object of the invention to provide a head lifting mechanism with a damper mechanism which may be simply assembled.

In order to accomplish the aforementioned and other objects, the head lifting mechanism, according to the present invention, includes a damper system having a sliding member and a biasing member. The biasing member biases an upper head supporting element toward a lower position thereof and is cooperable with the sliding member for allowing the upper head supporting element to gently move toward the lower position.

According to one aspect of the present invention, a head lifting mechanism for a drive unit comprises:

a lower head supporting element for supporting a lower head;

an upper head supporting element for supporting an upper head, the upper head supporting element being pivotably supported on the lower head supporting element so as to rotate around a first axis to move between an upper position in which a disc-shaped recording medium is introduced into a space defined by the upper and lower head supporting elements, and a lower position in which a disc-shaped recording medium is loaded into the drive unit; and a damper including a sliding member which slides in an essentially radial direction relative to the first axis determined by the position of the upper head supporting element, and a first biasing member for biasing the upper head supporting element toward the lower position, the first biasing member being pivotably supported on the lower head supporting element so as to rotate around a second axis essentially parallel to and away from the first axis by a predetermined distance, the first biasing member being cooperable with the sliding member for allowing the upper head supporting element to gently move toward the lower position.

The upper head supporting element may be formed with a recess which engages the sliding member so that the sliding member may slide within the recess. In addition, a space defined by the sliding member and the recess may be filled with a high-viscosity agent. In such case, a vertically projecting portion, which extends in a direction essentially perpendicular to said first and second axes, is formed on the bottom of said recess, and said sliding member has a groove which is engageable with said vertically projected portion. Alternatively, the sliding member may be provided with a resilient portion which elastically deforms for providing a damping effect to the sliding member when the upper head supporting element moves to the lower position. Preferably, the upper head supporting element is supported on the lower head supporting element via a leaf spring serving as a second biasing member which biases the upper head supporting element toward the lower position, and the first biasing member comprises a torsion spring.

According another aspect of the invention, the head lifting mechanism for a drive unit comprises:

a lower head supporting element for supporting a lower head;

an upper head supporting element for supporting an upper head, the upper head supporting element being pivotably supported on the lower head supporting element so as to rotate around an axis to move between an upper position in which a disc-shaped recording medium is introduced into a space defined by the upper and lower head supporting elements, and a lower position in which the disc-shaped recording medium is loaded in the drive unit;

a first biasing elements for biasing the upper head supporting element toward the lower position; and a damper including a sliding member which slides in an essentially radial direction relative to the axis determined by the position of the upper head supporting element, and an elongated member which is cooperable with the sliding member for allowing the upper head supporting element to gently move toward the lower position.

The lower head supporting element may be formed with a recess which engages the sliding member so that the sliding member may slide within the recess. In addition, a space defined by the sliding member and the recess may be filled with a high-viscosity agent. Furthermore, a vertically projecting portion, which extends in a direction essentially perpendicular to the axis, is formed on the bottom of the recess, and the sliding member has a groove which is engageable with the vertically projected portion. Preferably, the upper head supporting element is supported on the lower head supporting element via a leaf spring serving as a second biasing element that biases the upper head supporting element toward the lower position.

According to another aspect of the invention, the head lifting mechanism for a drive unit comprises:

a head carriage on which a lower head is mounted;

a head arm on which an upper head is mounted so as to be opposite to the lower head, the head arm being pivotably supported on the head carriage so as to rotate around a first axis to move between an upper position in which a disc-shaped recording medium is introduced into a space defined by the head carriage and the head arm, and a lower position in which the disc-shaped recording medium is loaded in the drive unit; and a damper including a sliding member which slides in an essentially radial direction relative to the first axis depending upon movement of the head arm, and a first biasing member for biasing the head arm toward the lower position, the first biasing member being pivotably supported on the head carriage so as to rotate around a second axis essentially parallel to and away from the first axis by a predetermined distance, the first biasing member being cooperable with the sliding member for allowing the head arm to gently move toward the lower position.

According to another aspect of the invention, the head lifting mechanism for a drive unit comprises:

a head carriage on which a lower head is mounted;

a head arm on which an upper head is mounted so as to be opposite to the lower head, the head arm being pivotably supported on the head carriage so as to rotate around an axis to move between an upper position in which the disc-shaped recording medium is introduced into a space defined by the head carriage and the head arm, and a lower position in which the disc-shaped recording medium is loaded in the drive unit;

a first biasing element for biasing the head arm toward the lower position; and a damper including a sliding member which slides in an essentially radial direction relative to the axis depending upon movement of the head arm, and an elongated member which is cooperable with the sliding member for allowing the head arm to gently move toward the lower position.

BRIEF DESCRIPTION OF THE DRAWINGS

The present invention will be understood more fully from the detailed description given herebelow and from the accompanying drawings of the preferred embodiment of the invention. However, the drawings are not intended to imply limitation of the invention to this specific embodiment, but are for explanation and understanding only.

In the drawings.

DESCRIPTION OF THE PREFERRED EMBODIMENT

Figure 1:
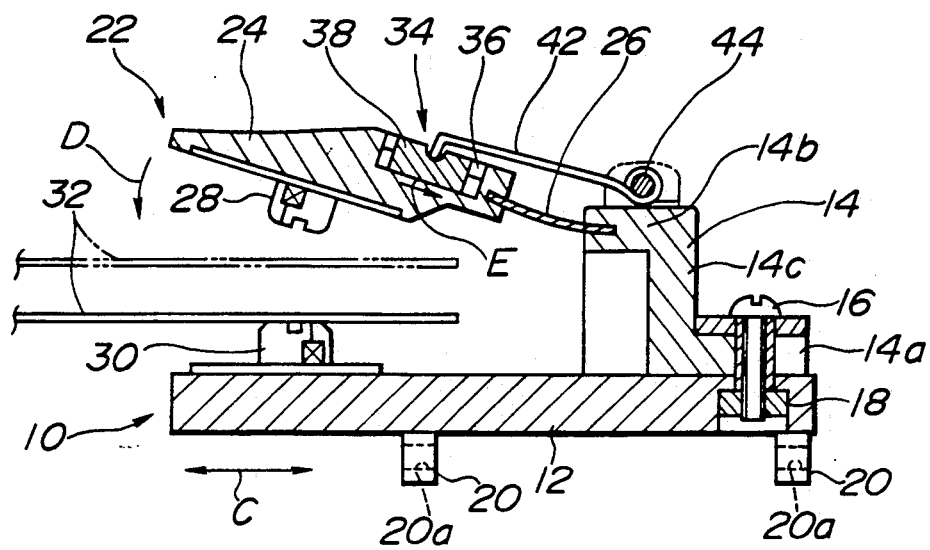
FIG. 1 is a cross section of the first preferred embodiment of a head lifting mechanism for a disc drive unit, according to the present invention, wherein a head arm is positioned at an upper position in which a disc is inserted into the disc drive unit.

Referring now to the drawings, particularly to FIG. 1 to 4, a head lifting mechanism according to the present invention is described herebelow.

Figure 2:
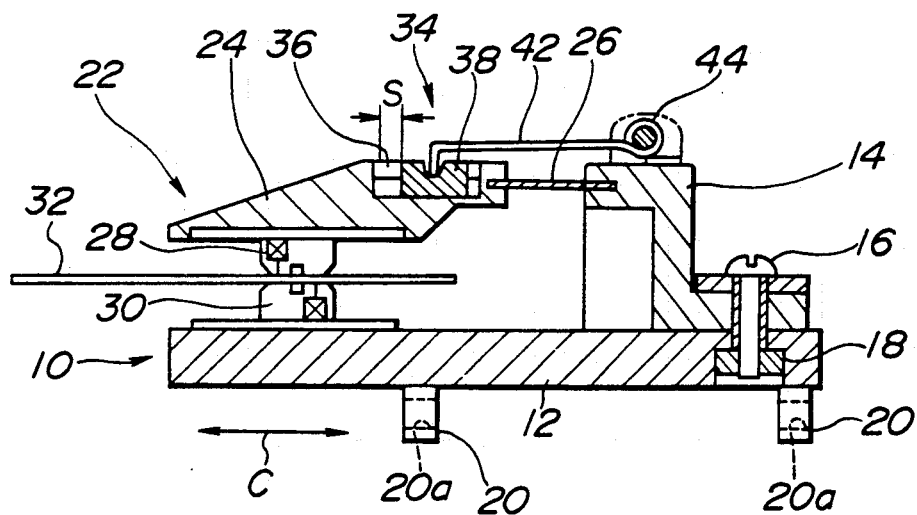
FIG. 2 is a cross section of the head lifting mechanism of FIG. 1, wherein the head arm is positioned at a lower position in which the disc is loaded on the disc drive unit.
Figure 3:
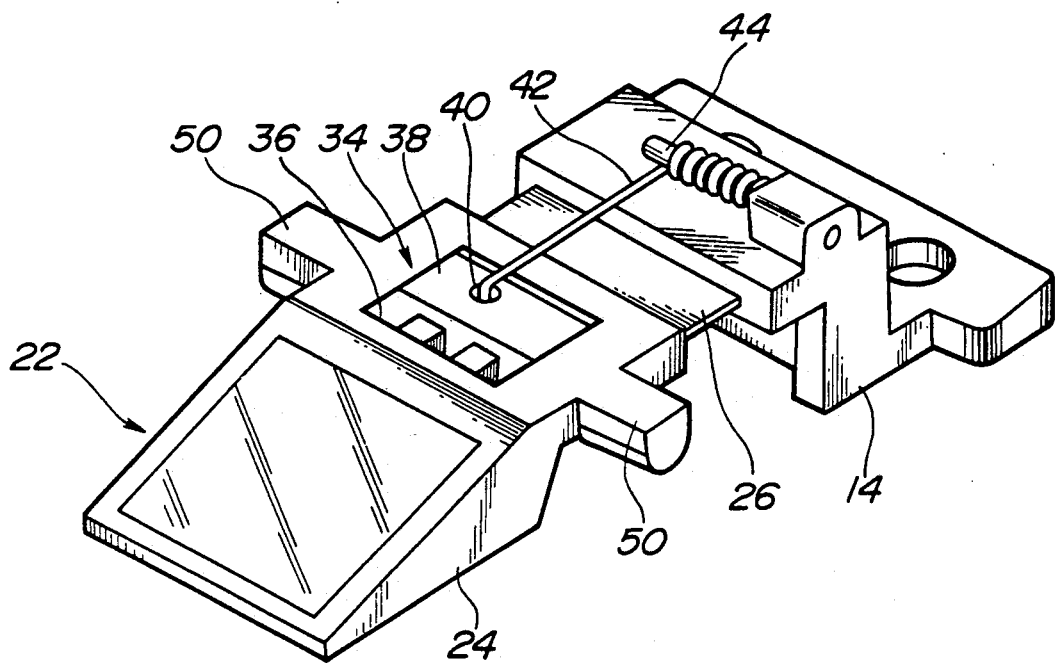
FIG. 3 is a perspective view of a portion of the head lifting mechanism of FIG. 1, which illustrates the damper mechanism of the head lifting mechanism.

FIG. 1 shows the head lifting mechanism positioned at its higher position, and FIG. 2 shows the mechanism positioned at its lower position.

As shown in FIGS. 1 and 2, the head lifting mechanism includes a head carriage 10 which comprises a lower head supporting member 12 and an arm mounting member 14. The arm mounting member 14 has an essentially Z-shaped cross-section. That is, the arm mounting member 14 comprises a fixing portion 14a and an upper portion 14b which extend parallel to the lower head supporting member 12, and a vertically extending portion 14c which is arranged therebetween. The fixing portion 14a of the arm mounting member 14 is secured to the lower head supporting member 12 by means of a screw 16 and a nut 18. The lower head supporting member 12 has vertically projecting portions 20, each of which is formed with a guide groove 20a. The guide groove 20a receives therein a guide rod (not shown) so that the head carriage 10 may be slidably supported on the guide rod for the purpose of moving the head carriage 10 in the directions indicated by the arrow C in FIGS. 1 and 2.

The head lifting mechanism has also a head arm 22 which comprises an upper head supporting member 24 and a leaf spring 26. One end of the leaf spring 26 is embedded in the upper portion 14b of the arm mounting member 14 to be fixed thereto, and the other end thereof is embedded in the upper head supporting member 24 to be fixed thereto. The leaf spring 26 can bend so that the head arm 22 is pivotably supported by the arm mounting portion 14 of the head carriage 10.

The upper and lower head supporting members 24 and 12 are respectively provided with upper and lower heads 28 and 30 on the facing surfaces thereof. By bending the leaf spring 26, the upper head 28 is movable between an upper position shown in FIG. 1 and a lower position shown in FIG. 2 in the direction of the arrow D shown in FIG. 1. When the upper head 28 is positioned in the lower position, the upper head 28 is designed to face the lower head 30. As shown in FIG. 1, when the upper head 28 is positioned in the upper position, a recording medium or disc 32 may be inserted into a space formed by the head carriage 10 and the head arm 22 so as to be arranged between the upper and lower heads 28 and 30. In this position, the disc 32 is movable between an upper position shown by a broken line in FIG. 1 and a lower position shown by a solid line. When the upper head 28 is in the lower position after the disc 32 is set in the lower position, the upper and lower heads 28 and 30 come into contact with both sides of the disc 32 so that recording and/or reproducing may be achieved.

According to the present invention, the head lifting mechanism is also provided with a damper mechanism 34. As seen clearly from FIG. 3, the damper mechanism 34 includes an essentially rectangular slide chamber 36 which is formed on the upper surface of the upper head supporting member 24, and an essentially rectangular sliding member 38 which is slidably received within the slide chamber 36. The space between the slide chamber 36 and the sliding member 38 is filled with high-viscosity agent such as silicone grease. The upper surface of the sliding member 38 is formed with an engaging hole 40 which engages one end of a torsion spring 42. The other end of the torsion spring 42 is supported on a spring supporting portion 44 which is provided on the upper surface of the upper portion 14b of the arm mounting member 14, so that the head arm 22 is biased toward the lower position thereof by spring force of the torsion spring 42. That is, the torsion spring 42 does not serve only as a connecting member which connects the sliding member 38 to the arm mounting member 14, but also as a biasing means which biases the head arm 22 toward the lower position thereof. Since the position of the spring supporting portion 44 in which one end of the torsion spring 42 is arranged differs from the position in which the leaf spring 26 is fixed to the arm mounting member 14, i.e. in which the axis of rotation of the head arm 22 is arranged, the sliding member 38 is slidable within the slide chamber 36 by a predetermined stroke S when the head arm 22 moves upwards and downwards.

Figure 4:
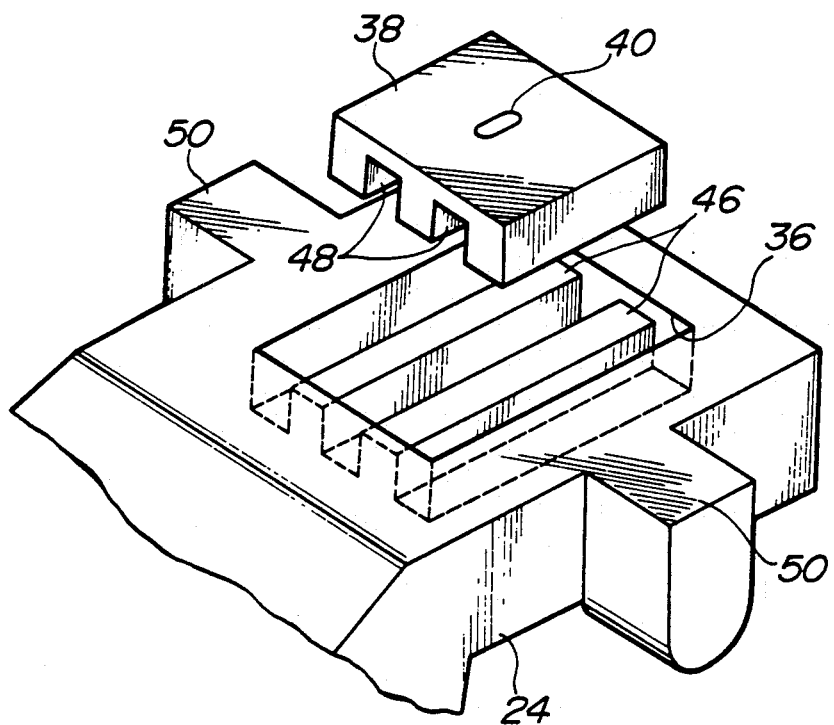
FIG. 4 is an enlarged, exploded perspective view which illustrates a slide chamber and a sliding member used in the head arm of FIG. 1.
Figure 5:
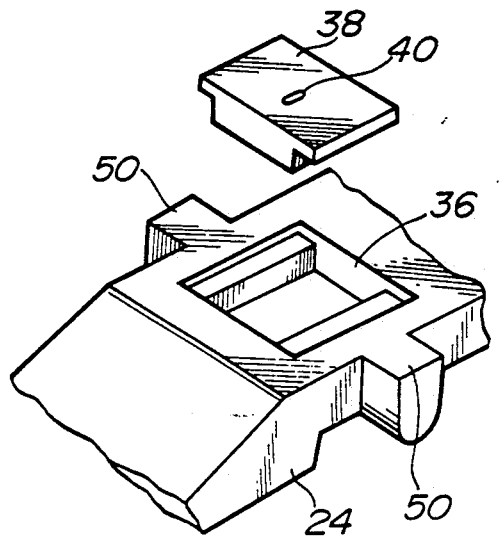
FIGS. 5(a) to 5(c) are exploded perspective views which illustrate other embodiments of a slide chamber and a sliding member used in the head lifting mechanism, according to the present invention.
Figure 5:
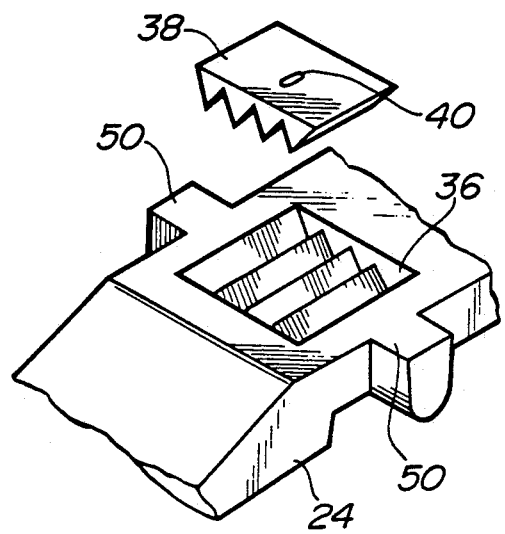
Figure 5:
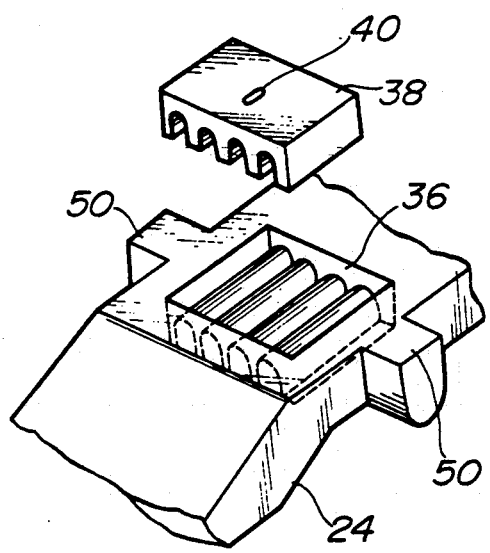

As seen clearly from FIG. 4, the slide chamber 36 is formed with a pair of longitudinally extending guide rails 46 which are parallel to each other and each of which has an essentially rectangular cross-section. Conversely, the sliding member 38 has a pair of longitudinally extending grooves 48 which are parallel to each other and which are engageable with the guide rails 46. This construction allows broader contact area between the slide chamber 36 and the sliding member 38. The fluid viscous resistance force F of the high-viscosity agent may be described as follows:

$$F = 2 \times \frac{\mu \times S}{h} \times v$$

wherein the contact area is S, the coefficient of viscosity is $\mu$, and a clearance between the sliding member 38 and the slide chamber 36 is h. Since the fluid viscous resistance force F is directly proportional to the contact area S and is inversely proportional to the clearance h, a predetermined damper effect may be obtained by changing these values. According to the present invention, as shown in FIGS. 5(a) to 5(c), other guide rail and groove arrangements for the slide chamber 36 and the sliding member 38 may be used. In FIG. 5(a), a pair of essentially rectangular guide rails are arranged at both sides within the slide chamber 36, and the sliding member 38 has an essentially T-shaped cross-section so as to be engageable with the guide rails of the slide chamber 36. In FIG. 5(b), a plurality of guide rails which have triangular or corrugated cross-sections are arranged in the slide chamber 36, and the sliding member 38 has reciprocating grooves which are engageable with the guide rails of the slide chamber 36. In FIG. 5(c), a plurality of guide rails which have round or corrugated cross-sections are arranged in the slide chamber 36, and the sliding member 38 has reciprocating grooves which are engageable with the guide rails. These constructions may be selected in accordance with conditions or restrictions as to the size of the upper head supporting member 24, damping requirements and the like.

In addition, the upper head supporting member 24 has a pair of projections 50 which extend outwards from the both sides of the upper head supporting member 24. The projections 50 serve to engage a disc holder (not shown). The disc holder is movable between a upper position in which the disc 32 may be inserted into or released from the upper and lower heads 28 and 30, i.e. in a case where the disc 32 is arranged at the position shown by the broken line in FIG. 1, and a lower position for loading the disc 32 in a disc drive unit, i.e. in a case where the disc 32 is arranged at the position shown by the solid line in FIG. 1. When the disc holder is positioned in the lower position, the projections 50 of the upper head supporting member 24 disengage from the head holder, so that the head arm 22 is arranged in the lower position shown in FIG. 2 due to spring force of the torsion spring 42.

With this construction, the disc 32 is, at first, inserted into the disc holder when the disc holder and the head arm 22 are in the upper position. The disc 32 moves from the upper position to the lower position immediately after the disc is inserted into the disc holder. Thereafter, the projections 50 of the upper head supporting member 24 disengage from the head holder, and then the head arm 22 moves to the lower position thereof due to the spring force of the torsion spring 42. At this time, the sliding member 38 moves against the viscous resistance of the high-viscosity agent within the slide chamber 36 in the direction of the arrow E in FIG. 1. Since the sliding member 38 moves slowly against the viscous resistance of the high-viscosity agent, the head arm moves slowly to the lower position, the upper head 28 therefore, also moves slowly to gently come into contact with the upper surface of the disc 32.

After the head arm 22 is fixed to the head carriage 10 in which the torsion spring is mounted, the damper mechanism is formed by introducing a high-viscosity agent such as silicone grease into the slide chamber 36. Thereafter, the sliding member 38 is inserted into the slide chamber 36, and then one end of the torsion spring is inserted into the engaging hole 40 of the sliding member 38, so that the assembly for the damping mechanism 34 is finished. As mentioned above, the damper mechanism 34 of the present invention is formed by arranging the sliding member 38 in the slide chamber 36 which is formed in the upper surface of the upper head supporting member 24. Therefore, according to the present invention, the thickness of the head lifting mechanism is substantially that of the head carriage 10 and the head arm 22. Accordingly, the thickness of a disc drive unit may be decreased by using the head lifting mechanism of the present invention in the disc drive unit. Since the damper mechanism 34 of the present invention essentially comprises only the sliding member 38, the high-viscosity agent such as silicone grease, and torsion spring 42, the number of parts for a damping mechanism may be considerably decreased and the construction thereof may be simplified. Additionally, the cost of manufacturing a head lifting mechanism may be decreased.

Figure 6:
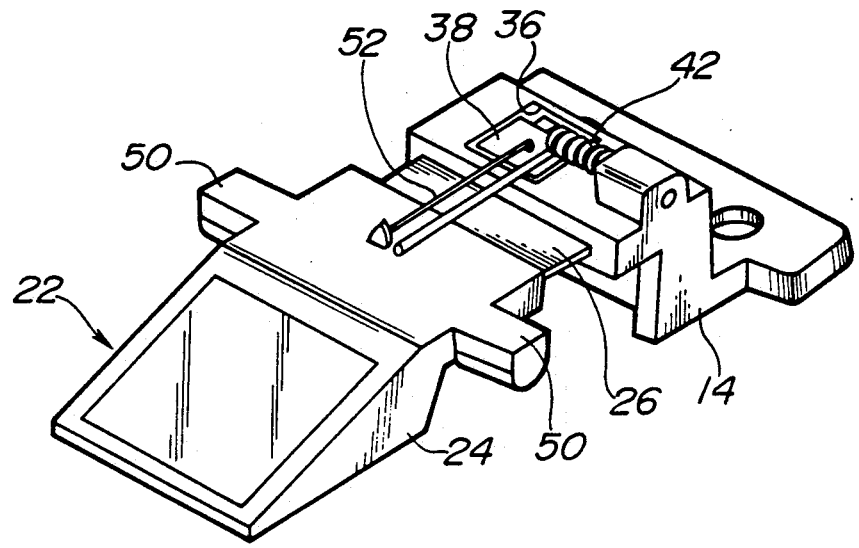
FIG. 6 is a perspective view of a portion of the head lifting mechanism, which illustrates a damper mechanism of a second preferred embodiment according to the present invention.

FIG. 6 illustrates a second preferred embodiment of a portion of the head lifting mechanism according to the present invention. In this embodiment, in contrast with the aforementioned embodiment, the slide chamber 36 is formed in the upper surface of the upper portion 14b of the arm mounting member 14. The sliding member 38 is arranged within the slide chamber 36 and is connected to the upper surface of the upper head supporting portion 24 by means of an elongated connecting member 52. Otherwise, the construction is similar to that of the aforementioned embodiment. With this construction, the operation or effect is essentially similar to that of the aforementioned embodiment.

Figure 7:
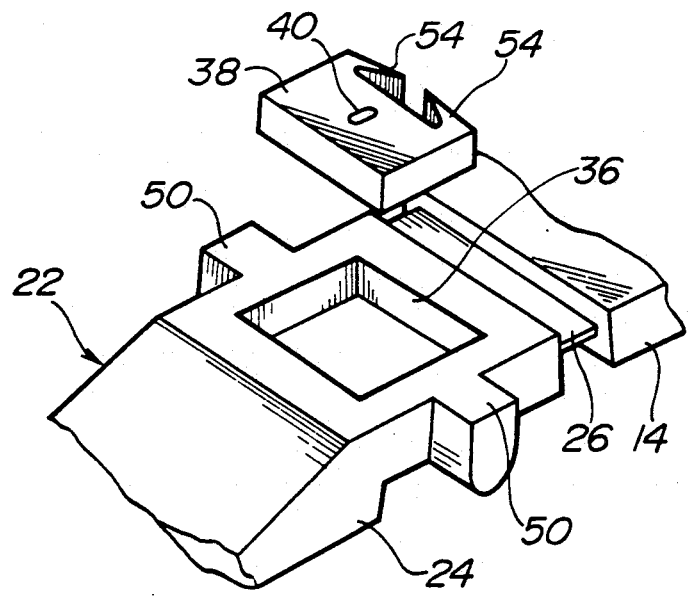
FIG. 7 is a perspective view of a portion of the head lifting mechanism, which illustrates a damper mechanism of a third preferred embodiment according to the present invention.

FIG. 7 illustrates a third preferred embodiment of a portion of the head lifting mechanism according to the present invention. In this embodiment, the sliding member 38 is provided with a resilient portion 54 on a side surface thereof near the arm mounting member 14, and no high-viscosity agent is used in the space defined by the sliding member 38 and the slide chamber 36. According to this embodiment, when the head arm moves downwards and the sliding member 38 slides within the sliding chamber 36, the resilient portion 54 elastically deforms in contact with the inner side surface of the slide chamber 36, so that the damper effect for the head arm 22 may be achieved. In addition, in this embodiment, the head arm 22 may move smoothly when going from the lower position to the upper position, since no high-viscosity agent is used in the space defined by the sliding member 38 and the slide chamber 36.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A head lifting mechanism for a drive unit which drives a disc-shaped recording medium, said head lifting mechanism comprising:

lower head supporting means for supporting a lower head;

upper head supporting means for supporting an upper head, said upper head supporting means being pivotally supported on said lower head supporting means so as to rotate around a first axis to move between an upper position in which said disc-shaped recording medium is introduced into a space defined by said upper and lower head supporting means, and a lower position in which said disc-shaped recording medium is loaded on said drive unit; and damper means for damping rotation of said upper head supporting means about said first axis and including a sliding member which slides in a substantially radial direction relative to said first axis in response to said upper head supporting means pivoting about said first axis, and a first biasing member for biasing said upper head supporting means toward said lower position, said first biasing member being pivotally supported on said lower head supporting means so as to rotate around a second axis substantially parallel to and spaced-apart from said first axis by a predetermined distance, said first biasing member cooperating with said sliding member for allowing said upper head supporting means to gently move toward said lower position.

2. A head lifting mechanism as set forth in claim 1, wherein said damper means further includes a recess formed in the upper head supporting means adapted to have said sliding member slide within the recess.

3. A head lifting mechanism as set forth in claim 2, wherein a space defined by said sliding member and said recess is filled with a high-viscosity agent.

4. A head lifting mechanism as set forth in claim 2, wherein said damper means further includes in said recess a vertically projecting portion extending in a direction substantially perpendicular to said first and second axes and formed on the bottom of said recess, and in which said sliding member has a complementary groove which is engageable with said vertically projecting portion.

5. A head lifting mechanism as set forth in claim 2, wherein said sliding member has a resilient portion which elastically deforms against a wall of said recess when said upper head supporting means moves to said lower position, thereby damping sliding motion of said sliding member.

6. A head lifting mechanism as set forth in claim 1, wherein said upper head supporting means is supported on said lower head supporting means via a leaf spring serving as a second biasing member which biases said upper head supporting means toward said lower position.

7. A head lifting mechanism as set forth in claim 1, wherein said first biasing member is a torsion spring.

8. A head lifting mechanism for a drive unit which drives a disc-shaped recording medium, said head lifting mechanism comprising:

lower head supporting means for supporting a lower head;

upper head supporting means for supporting an upper head, said upper head supporting means being pivotally supported on said lower head supporting means so as to rotate around an axis to move between an upper position in which said disc-shaped recording medium is introduced into a space defined by said upper and lower head supporting means, and a lower position in which said disc-shaped recording medium is loaded in said drive unit, first biasing means arranged between said upper and lower head supporting means for biasing said upper head supporting means toward said lower position; and damper means arranged between said upper and lower head supporting means for damping rotation of said upper head supporting means about said axis and including a sliding member which slides in a recess in a substantially radial direction relative to said axis in response to movement of said upper head supporting means, and an elongated member affixed to said sliding member and extending between said upper and lower head supporting means for allowing said upper head supporting means to gently move toward said lower position.

9. A head lifting mechanism as set forth in claim 8, wherein said recess is formed in the lower head supporting means and said sliding member slides within the recess.

10. A head lifting mechanism as set forth in claim 9, wherein a space defined by said sliding member and said recess is filled with a high-viscosity agent.

11. A head lifting mechanism as set forth in claim 9, wherein a vertically projecting portion extending in a direction substantially perpendicular to said axis is formed on a bottom surface of said recess, and said sliding member has a groove engaged with said vertically projecting portion.

12. A head lifting mechanism as set forth in claim 8, wherein said upper head supporting means is supported on said lower head supporting means via a leaf spring serving as a second biasing means which biases said upper head supporting means toward said lower position.

13. A head lifting mechanism as set forth in claim 8, wherein said first biasing means is a torsion spring.

14. A head lifting mechanism for a drive unit which drives a disc-shaped recording medium, said head lifting mechanism comprising:

a head carriage on which a lower head is mounted;
a head arm on which an upper head is mounted so as to be opposite said lower head, said head arm being pivotally supported on said head carriage so as to rotate around a first axis to move between an upper position in which said disc-shaped recording medium is introduced into a space defined by said head carriage and said head arm, and a lower position in which said disc-shaped recording medium is loaded in said drive unit; and
damper means for damping rotation of said head arm about said first axis and including a sliding member which slides a substantially radial direction relative to said first axis in response to movement of said head arm, and a first biasing member for biasing said head arm toward said lower position, said first biasing member being pivotally supported on said head carriage so as to rotate around a second axis substantially parallel to and spaced-apart from said first axis by a predetermined distance, said first biasing member cooperating with said sliding member for allowing said head arm to gently move toward said lower position.

15. A head lifting mechanism for a drive unit which drives a disc-shaped recording medium, said head lifting mechanism comprising:

a head carriage on which a lower head is mounted;
a head arm on which an upper head is mounted so as to be opposite said lower head, said head arm being pivotally supported on said head carriage so as to rotate around an axis to move between an upper position in which said disc-shaped recording medium is introduced into a space defined by said head carriage and said head arm and a lower position in which said disc-shaped recording medium is loaded in said drive unit;
first biasing means for biasing said head arm toward said lower position; and
damper means for damping rotation of said head arm about said axis and including a sliding member which is separate from said first biasing means and slides substantially radially relative to said axis in response to movement of said head arm, and an elongated member extending between said head carriage and said head arm for cooperating with said sliding member for allowing said head arm to gently move toward said lower position.

* * * * *